July 18, 1967
M. O'BRIEN
3,331,197
MELON HARVESTER AND METHOD OF HARVESTING MELONS
Filed March 9, 1964
6 Sheets-Sheet 1
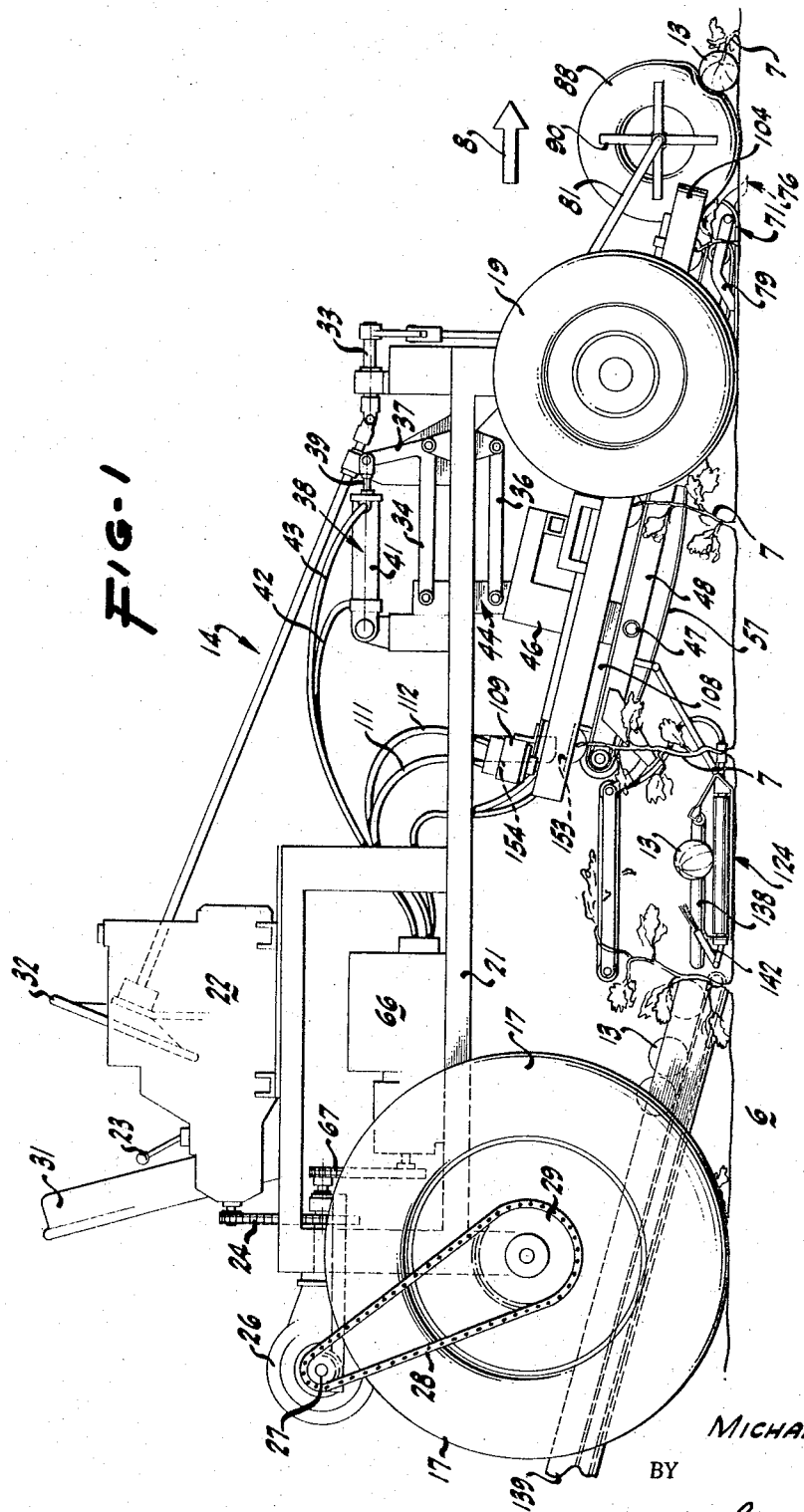
INVENTOR.
MICHAEL O'BRIEN
BY
Lothrop & West
ATTORNEYS

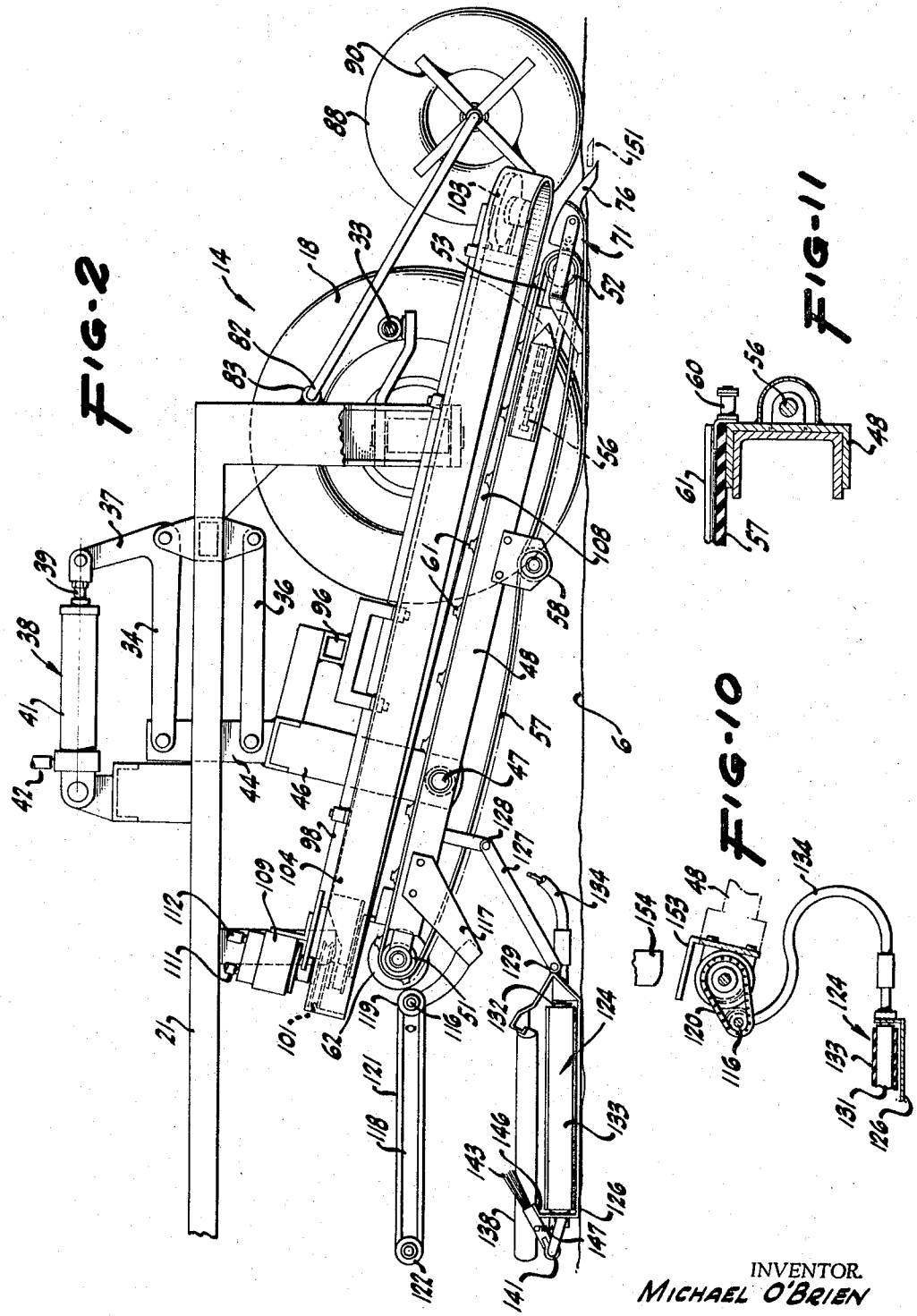

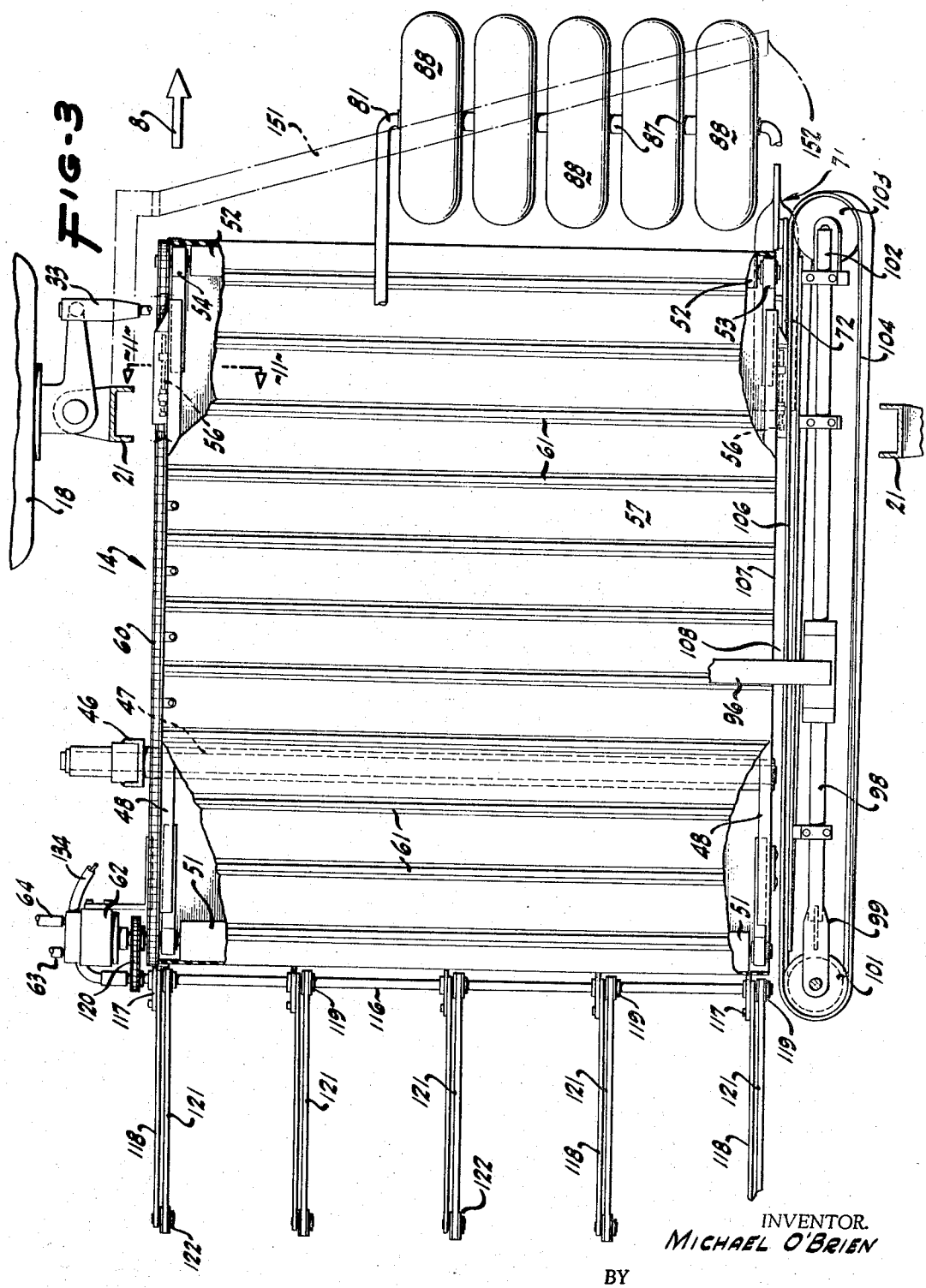

July 18, 1967  M. O'BRIEN  3,331,197
MELON HARVESTER AND METHOD OF HARVESTING MELONS
Filed March 9, 1964  6 Sheets-Sheet 4
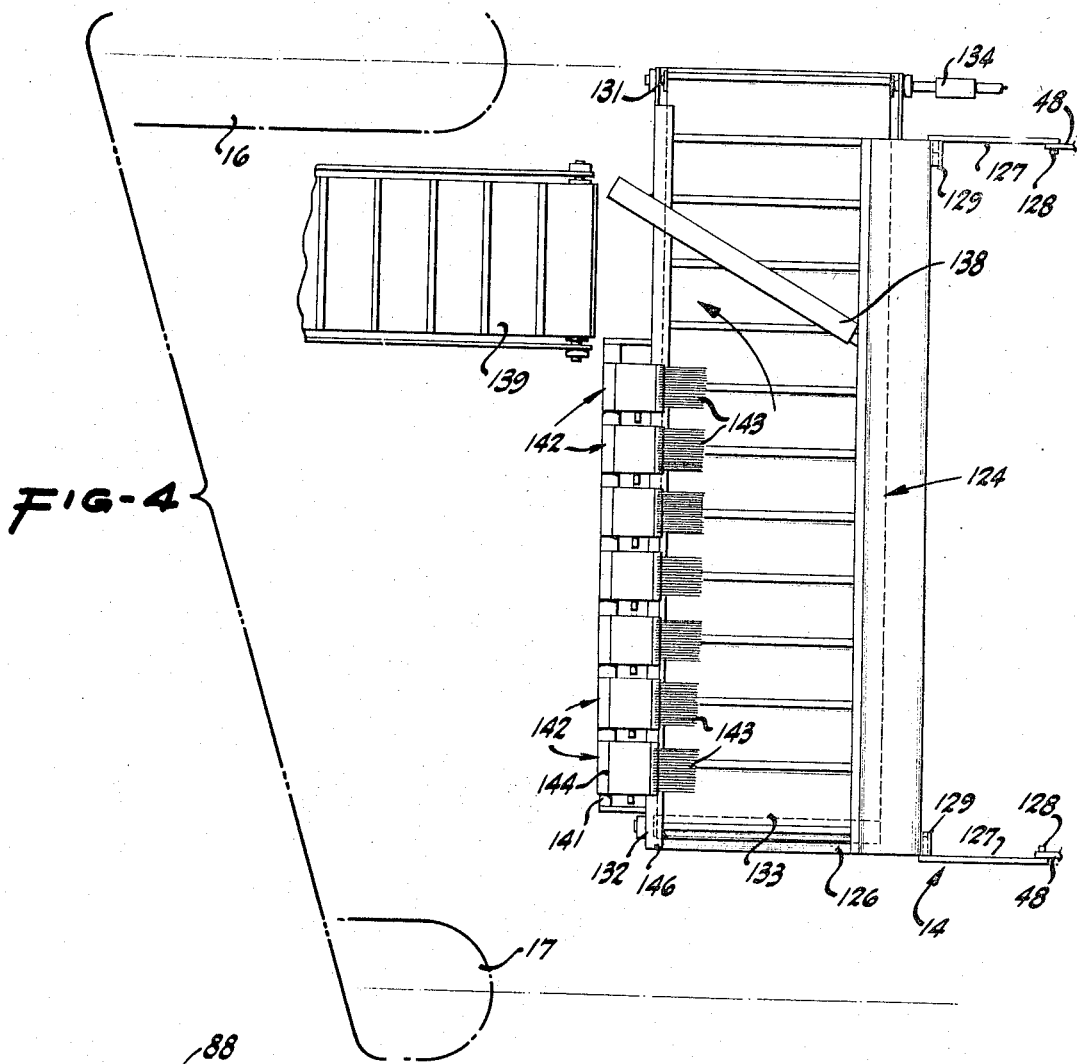
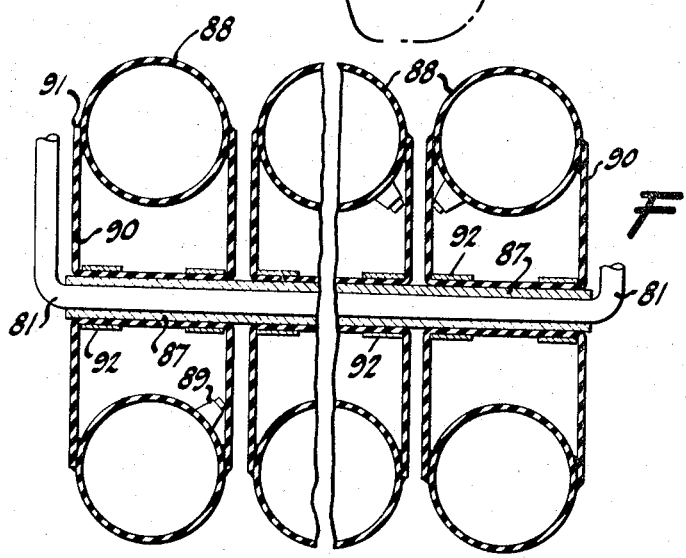
INVENTOR.
MICHAEL O'BRIEN
BY
Lothrop & West
ATTORNEYS July 18, 1967  M. O'BRIEN  3,331,197

MELON HARVESTER AND METHOD OF HARVESTING MELONS

Filed March 9, 1964  6 Sheets-Sheet 5

INVENTOR.
MICHAEL O'BRIEN
BY
Lothrop & West
ATTORNEYS

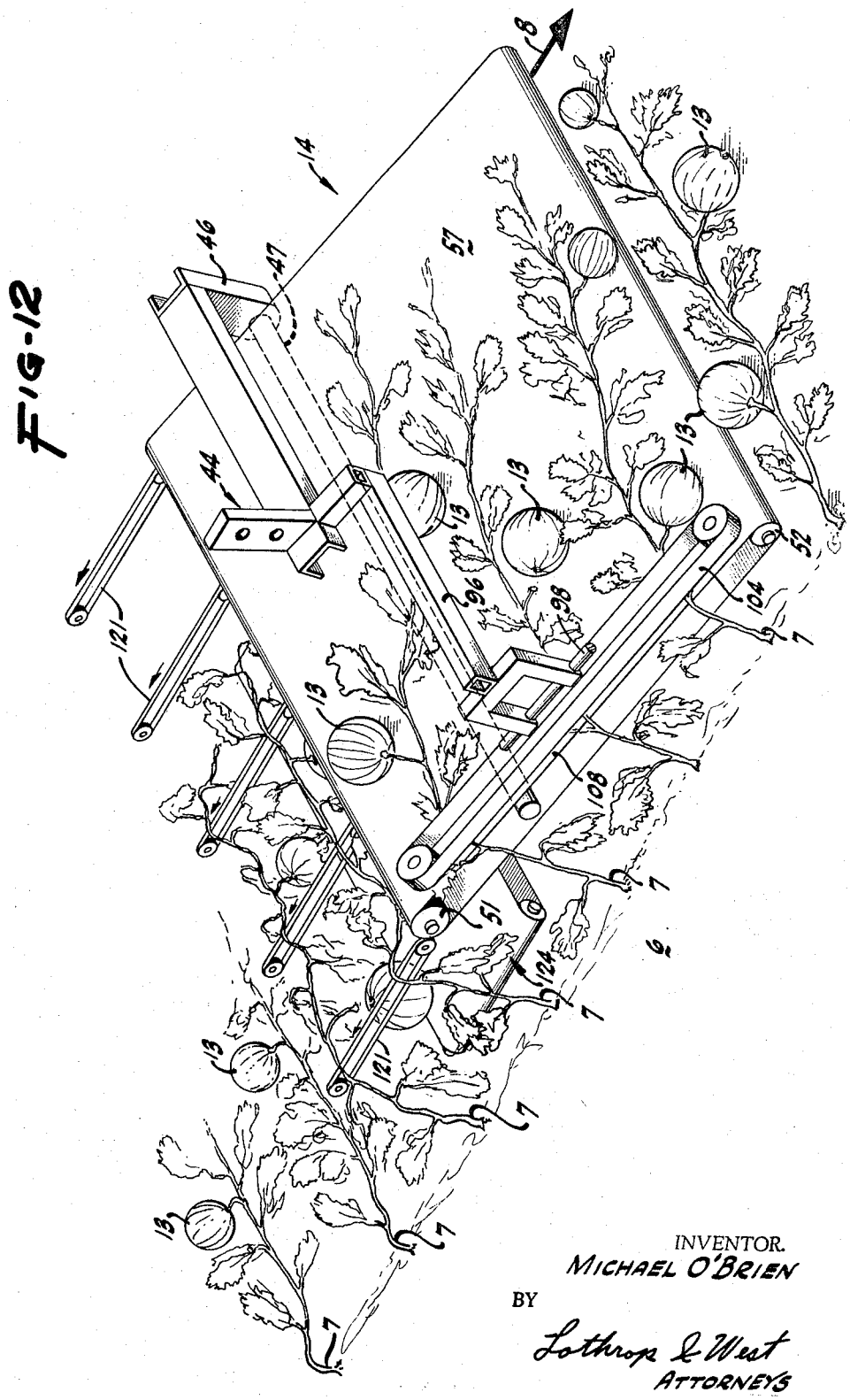

United States Patent Office 3,331,197
Patented July 18, 1967

3,331,197
MELON HARVESTER AND METHOD OF
HARVESTING MELONS
Michael O'Brien, Davis, Calif., assignor to The Regents
of the University of California, Berkeley, Calif.
Filed Mar. 9, 1964, Ser. No. 350,252
5 Claims. (Cl. 56—327)

The invention relates to a particular growing technique and an especial mechanism for use in harvesting melons, such as canteloupes, from the growing fields.

Much of the present melon culture is conducted with the vines growing generally at random in the field and with manual harvesting of the melons as they ripen. There is an increasing need, particularly an economic need, for effectuating the harvesting by mechanical means. It is therefore a general object of the invention not only to provide a machine which can be operated in the field for successfully harvesting the melons, but also to provide an improved growing technique which will lend itself to such mechanical harvesting.

Another object of the invention is to provide a means and method for harvesting melons which will remove the melons at optimum ripeness and will not destroy nor injure the vines or the melons.

Another object of the invention is to provide a means and method of harvesting melons in which the amount of labor utilized is greatly reduced.

A still further object of the invention is to provide a melon harvester which can be driven in the growing fields at different times during the season without damage to the growing vines and which will be effective to remove only the melons which are in optimum condition for picking.

Another object of the invention is to provide a method of growing melons so that the melon vines and melons will be physically arrayed in such a way as to enhance the melon harvest by machine.

Another object of the invention is to provide a mechanical melon harvester which will selectively harvest melons, taking those which are in proper condition for picking, yet leaving those which can be further ripened for subsequent picking.

A still further object of the invention is to provide a mechanical melon harvester which can operate to remove the melons from the vines yet which will leave the vines in the desired physical array and in continuing growing condition.

A still further object of the invention is to provide a mechanical means for repeatedly harvesting melons from the same growing field without at any time deleteriously affecting the continuous growth of the vines and the remaining melons.

Other objects together with the foregoing are attained in the embodiment of the invention described in the accompanying description and illustrated in the accompanying drawings, in which:

FIGURE 1 is a side elevation of a form of melon harvester constructed in accordance with the invention;

FIGURE 2 is a side elevation to a larger scale of one portion of the harvester shown in FIGURE 1, some of the near mechanism being broken away more clearly to disclose the structure;

FIGURE 3 is a plan of the structure illustrated in FIGURE 2, certain of the upper mechanism being removed;

FIGURE 4 is a plan of the rearward portion of the harvester, especially showing some of the melon handling mechanism;

FIGURE 6 is a view similar to FIGURE 5, but drawn to a larger scale and showing the mechanism in cross section on a transverse vertical plane, a portion of the center of the figure being removed;

FIGURE 10 is a detail showing part of a drive mechanism for a melon conveyor;

FIGURE 11 is a detail cross section, the plane of which is indicated by the line 11—11 of FIGURE 3; and FIGURE 12 is a perspective view, partly diagrammatic, of some portions of the melon harvester showing the progress of growing vines with melons thereon through the harvesting machine.

While canteloupes have been referred to herein as appropriate melons for use in the method of the invention and in the operation of the melon harvester, and while such use has been practically carried into effect, other melons, particularly those of related nature such as honeydew melons and the like, can be similarly treated.

Figure 7:
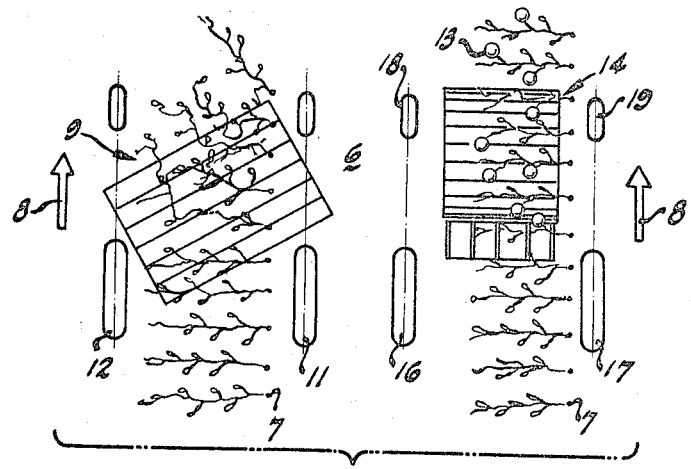
FIGURE 7 is a plan showing drammatically part of the growing technique for the vines and showing part of the harvesting technique for the melons.

In accordance with the invention, and as more particularly disclosed in my copending application entitled "Vine Training Device" filed Mar. 9, 1964 with Ser. No. 350,-253, now Patent 3,277,605 and assigned to the assignee hereof, it is preferred to plant the melon vines in a field 6 (FIGURE 7) with each of the melon plants 7 started at a site so that all of the various sites are arranged in alignment, preferably in a straight line, and extending in a predetermined direction as indicated by the arrow 8. As the vines grow and extend from their sites 7, the field is repeatedly traversed by a vine trainer 9, as particularly disclosed in my copending application. The result is that the growing vines then all extend parallel to each other and in a direction normal or perpendicular to the predetermined direction 8 and on the same side of the growing site. The distance between the wheels 11 and 12 of the trainer 9 is such that they at no time run over any of the growing vine parts, and the frame of the machine straddles the growing vines.

When the vines have grown sufficiently and when a number of melons 13 have developed thereon, and when it is time to harvest at least some of the growing melons, I operate in the field 6 and in the predetermined direction 8 normal to the direction of the vine growth a subsequent machine 14 referred to as a harvester. The harvester is a carriage having a pair of rear ground-engaging wheels 16 and 17 with sufficient space between them so that the machine straddles the growing vines. Similarly, the harvester has a pair of front ground-engaging and dirigible wheels 18 and 19 equally spaced apart. The wheels are mounted on a main frame 21 made up of the customary shapes and angles and effective to straddle the vine growing portion of the field 6.

Mounted on the frame 21 is an engine 22 having an appropriate controller 23 and connected by an appropriate drive train 24 to a differential 26. The differential is connected to axles 27, each of which extends outboard of a related one of the wheels 16 and 17 and at its end is joined by a drive chain 28 to a driven sprocket 29 fast on the wheel. When the engine 22 is operated, the ground-engaging wheels 16 and 17 are propelled to drive the carriage or frame 21 in the direction 8 and at a speed regulated by an operator who has a position 31 on the frame 21 and adjacent the engine 22. Also available at the operator's position is a steering wheel 32 connected by appropriate steering mechanism 33 to the dirigible front wheels 18 and 19 so that the carriage as a whole can be appropriately guided in the field.

Appropriately mounted on the frame 21 or parts thereof are parallel links 34 and 36 connected by a crank arm 37 to a hydraulic jack 38. The connection to the crank arm 37 is by means of a piston rod 39 movable within a cylinder 41 as governed by hydraulic pressure. Hydraulic pressure fluid is supplied through flexible hoses 42 and 43 to the opposite ends of the jack 38 and is under the control of an operator at the station 31. The ends of the parallel links 34 and 36 are joined to the upper end of a conveyor frame 44. When the jack 38 is appropriately operated, the frame 44 is raised or lowered substantially in a vertical path and approaches or recedes from the ground.

Depending from the frame 44 and disposed generally at one side only of the frame 21 is a lifting frame 46 from which a cross shaft 47 included in the frame is cantilevered. Journalled on the cross shaft 47 is a lifting belt conveyor frame 48 generally rectangular in plan and mounted to tilt on the shaft 47 but being entirely free along one side or edge opposite to the frame 46. The frame 48 carries belt rollers 51 and 52. The forward roller 52 is mounted in adjustable journals 53 and 54 movable into an appropriate aligned position by means of jack screws 56 (FIGURE 11). Trained around the rollers 51 and 52 is a lifting belt 57. This constitutes an endless conveyor appropriately tensioned and having an upper run spaced substantially from the ground and a lower run adjacent to the ground. The lower run is held in position by an idle roller 58 suspended beneath and supported from the frame 48. The belt 57 is provided with a number of transverse cleats 61 or irregularities so that it serves as a friction member either by reason of such pronounced irregularities or in the absence of cleats by miscellaneous roughnesses on its surfaces.

In order to advance the belt 57, the roller 51 and a belt-connected chain 60 are driven by means of a hydraulic motor 62 mounted on the frame 48 and supplied with hydraulic fluid through conduits 63 and 64 extending to a hydraulic mechanism 66 on the frame 21 driven by the engine 22 through a drive structure 67. This same hydraulic mechanism supplies fluid under pressure for operating the jack 38. The supply of hydraulic fluid to the drive motor 62 for the belt 57 is closely related to the drive of the ground-engaging wheels 16 and 17. The arrangement is such that the upper run of the belt 57 moves rearwardly with respect to the carriage frame 21 at the same speed that the carriage advances over the field 6 in the direction 8. Since the direction of the upper run of the belt is opposite the direction 8, the net effect is that the upper run of the belt 57 does not make any motion with respect to the ground 6, but is in effect stationary despite the advance of the carriage.

Figure 8:
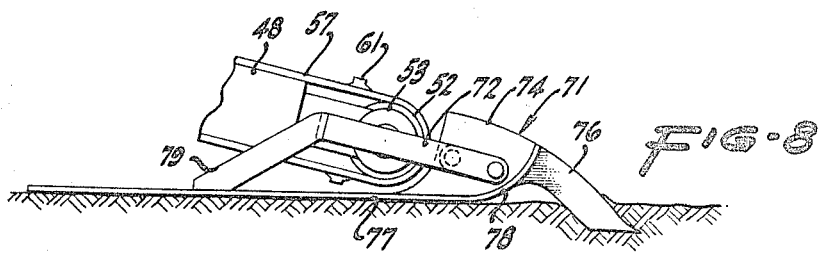
FIGURE 8 is a side elevation showing the vine engaging shoe in one position of operation.
Figure 9:
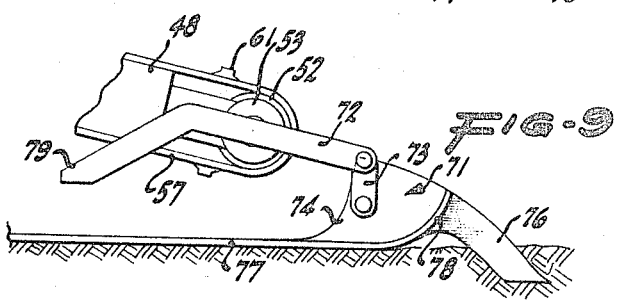
FIGURE 9 is a side elevation showing the vine engaging shoe in another position of operation.

Since the frame 48 is pivoted on the shaft 47 with the weight well forward, means are provided for establishing the level of the leading edge of the belt 57 and for ensuring that the vine stalks readily engage the belt 57. Despite variations in the vertical position of the forward end of the frame, a shoe 71 (FIGURES 8 and 9) serves as a guide onto the frame 48. The frame 48 is extended by a bracket 72 carrying a pivoted link 73. The shoe 71 is pivoted to the free end of the link 73 so that the shoe can maintain a horizontal position despite moderate rising and falling of the frame 48. The shoe 71 includes a vertical web 74 having a downwardly directed forwardly extending nose 76 and also has an approximately horizontal plate 77 with an upturned forward end 78.

When the jack 38 is operated to lower the frame 44 and thus to lower the frame 48 toward the ground, the link 73 swings and the plate 77 rides on the ground surface. When the carriage is advanced, the nose 76 pierces the ground and plows into it, tending always to exert a downward force. This in turn tends to rotate or move the rearward portion of the plate 77 into abutment with a stop arm 79 forming a rearward extension of the bracket 72.

As the carriage advances, the nose 76 tends to dig in and lower the forward end of the frame 48, but the plate 77, having substantial supporting area, resists this force. An equilibrium position is attained with the plate 77 in contact with the ground adjacent the surface. Due to ground irregularities, the frame 48 may rise and fall relative to the plate 77, yet the shoe arrangement affords a continuous support for vines under-ridden by the shoe 71 and then overlying the frame 48. The shoe also helps maintain the frame 48 at a low position close to the ground. Since the shaft 47 is considerably higher than this location, the frame 48 is given an inclination or tilt from a forward low point to a rearward high point.

When the carriage is advanced in the direction 8 with the hydraulic motor 62 operating to move the lifting belt conveyor relative to the frame (keeping the upper run thereof stationary with respect to the ground), the machine in straddling the planted rows of substantially parallel vines encounters the vines almost uniformly along one side thereof. The roughnesses or cleats on the belt 57 help to engage the vines and the melons and hold them as they are being lifted vertically upward by the advancing carriage. Stated differently, even though the carriage is advancing, the speed of operation of the upper run of the belt 57 nullifies this advancing movement so far as the vines and melons thereon are concerned. The vines and melons engaged by the belt remain substantially in a horizontal, parallel attitude and are raised substantially vertically as the machine passes thereunder.

It has been noted in practice that despite a relatively small radius on the forward end of the belt 57 rounding the roller 52, there is some tendency to bulldoze the relatively round melons ahead of the machine. This is undesirable since it tends to displace the vines and the aim is to disturb the melons as little as possible. To immobilize the melons and to hold them for ready entrainment or encounter with the lifting belt conveyor 57, I preferably provide a stabilizing device on the front of the machine.

Figure 5:
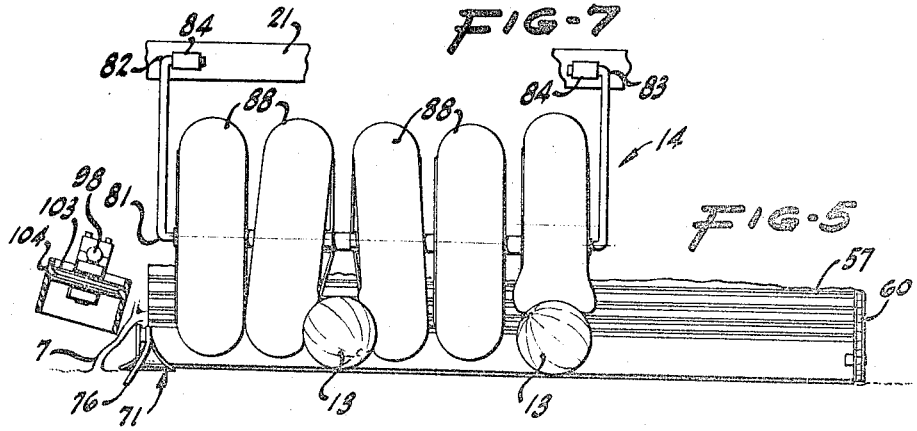
FIGURE 5 is a front elevation of the leading portion of the harvester, some parts being shown in cross section and other parts being removed for clarity of disclosure.

As particularly shown in FIGURES 3, 5 and 6, the forward portion of the frame 21 is provided with a leading axle 81 in the form of a crank, so that the main portion of the axle extends horizontally and transversely of the frame 21, whereas the upwardly trailing ends of the crank have terminals 82 and 83 journalled in bearings 84 and 86 on the frame 21. In effect, the cranked axle is pushed ahead of the frame 21. Surrounding the axle 81 is a continuous sleeve 87 and surrounding the sleeve 87 at intervals are toroidal rubber tubes 88. In practice, inner tubes from vehicle tires are used. Each tube 88 is provided with an inflating stem 89 so that a moderate air pressure can be carried within the tube to maintain its toroidal shape under normal conditions. The tube 88 is connected on opposite sides to the sleeve 87 by means of flexible rubber straps 90. Each of these at one end 91 is joined by cement or vulcanizing to the periphery of the toroidal tube 88 and at the other end extends along the sleeve 87 being held in place thereon by appropriate circular clamps 92. The straps 90, usually four in number on each side of each tube, form flexible spokes. The tube 88, in addition to its normal deflections, can be displaced to either side, fore and aft and up and down relative to the axle 81 and can be skewed with respect to the axle.

The toroidal tubes 88 are spaced some distance apart comparable to the dimensions or maximum diameter of the melons being harvested. While the canteloupes are illustrated herein and are shown as geometrical spheres and while some melons closely approximate this geometrical shape, the representation is diagrammatic only because the actual shapes of the canteloupes vary from melon to melon, but close contact, despite shape, is made by the tube 88. The weight of the toroidal tube mechanism 88 is not sufficient when it runs over the vines in advance of the carriage to cause any damage whatsoever to the melons nor to the vines. Yet as the toroidal tubes encounter the melons, they tend to ride up over them. The tubes are deflected or indented singly or in pairs so that the melons themselves are held virtually stationary on the ground and are stabilized so as to ride readily up onto the lifting belt conveyor 57. The toroidal tubes 88 can turn partial circles with respect to the sleeve 87, but the sleeve balances the turning resistance between tubes and itself has substantial turning resistance. The tubes oscillate and swing in such a fashion as to grip, engage and assist in loading the melons and the vines onto the conveyor 57.

As illustrated in FIGURE 12, the growing vines with the melons attached thereto ride up onto the lifting belt conveyor 57 and in effect are raised vertically, always remaining substantially parallel to themselves and parallel to the ground, so that they are spaced at increasing distances above the ground as the harvester advances. Since the vines are never severed from the ground, but continue in their growing condition, and because the conveyor 57 is at an increasingly great height from the ground toward the rear, there is a tendency for the vines and attached melons on the conveyor 57 to be pulled to the free side of the conveyor as they are lifted. The melons have substantial frictional engagement with the belt 57. There is thus imposed a frictional resistance to the lateral movement of the melons on the belt 57. In many instances the resulting tension between the pulling vine and the retarded melon is sufficient to disrupt the abscission layer. The melon becomes detached while it is resting on the belt 57 and while the vine is slowly being drawn toward the free side of the conveyor 57. Any melons so detached are retained by the cleats 61 or other roughnesses and are carried along with the belt. Some melons not ripe enough to be harvested remain attached to the vines.

It is possible to pick some nearly ripened and acceptable melons by putting more strain between the vine and the melon that can be exerted merely by frictional resistance on the belt 57. A melon stop or retainer is therefore provided. Built out from the inboard side of the frame 46 and extending entirely across and above the belt conveyor frame 48 is a support bar 96 which terminates at the free or outboard side of the conveyor 57. Supported by this cantilever is a retaining belt conveyor frame 98 including an elongated tube arranged parallel to and above the free edge of the conveyor 57. At one end, the tube 98 (FIGURE 3) carries a yoke 99 and a pulley 101, whereas at the other end the tube 98 carries a yoke 102 and a pulley 103. While the axis of the pulley 101 is substantially vertical, the axis of the pulley 103 is inclined inwardly at the top.

Trained around the pulleys 101 and 103 is a retaining belt conveyor 104. This belt is similar to the belt 57 although it is devoid of roughnesses or cleats. It is arranged with the inner run of the retaining belt at its lower edge 106 substantially parallel to the upper, free edge 107 of the belt 57. These edges 106 and 107 are spaced apart to afford a longitudinal gap 108 between the full length of the belts and open at the forward and rearward ends to allow a completely unobstructed, through path. The width of the uniform gap 108 is great enough easily to pass any of the melon vines and leaves but is small enough to pass only immature melons and to block relatively large melons available for picking.

The belt 104 is preferably driven at the same speed as the belt 57 and with the adjacent runs of the belts going in the same direction, so that there is no relative movement in a rearward direction with respect to melons which may be adjacent thereto. To drive the belt 104, the pulley 101 is connected to a hydraulic motor 109 (FIGURE 1, FIGURE 2) joined by hydraulic hoses 111 and 112 to the source of hydraulic pressure fluid 66. Since the motors 62 and 109 drive their respective belts at the same speed, they can be combined and mechanically connected if desired, but for simplicity, separate synchronously operating motors are preferred.

As the vines are drawn toward the free edge of the conveyor 57 as the conveyor rides under them, some melons available for picking and of a size not capable of passing through the gap 108 ride against the retaining belt conveyor run 106 and have additional strain placed upon them so that if the abscission layer permits, the melons are picked at this point or detached from their vines. As the carriage advances, picked melons and vines with melons still attached thereto eventually ride over the trailing roller 51 at the rear of the belt 57. During this time, the vines remain substantially parallel to each other and to their original positions.

At the rearward end of the lifting belt conveyor 57 means are provided for supporting the vines in their same relative location. For that reason, there is appropriately journalled on the frame 48 a cross shaft 116 held in an appropriate attitude by mounting brackets 117. Also extending from the brackets 117 are support bars 118. Coaxial with the shaft 116 and fast thereon are pulleys 119, each carrying a belt 121 also trained around one of a group of pulleys 122 at the outboard end of the bars 118. The shaft 116 is driven (FIGURES 3 and 10) by a chain 120 from the motor 62.

As the vines trail off of the conveyor 57, they drop slightly to be supported on the various parallel belts 121. These belts are spaced apart across the width of the machine so as to be adequate in number to support the entire vine substantially in horizontal transverse position. The spacing of the belts 121, however, is greater than the maximum diameter or dimension of any melon which has been carried up the conveyor 57 and passes over the discharge end thereof. Such melons fall between the belts 121 and onto a discharge conveyor 124.

The conveyor 124 is primarily a sled including a pan 126 extending transversely of the frame 21 and resting upon the ground. It is free to rise and fall but is held in appropriate fore and aft, and transverse position by links 127. At their forward ends the links are connected by detachable pivots 128 to the frame 48 and at their rearward ends are connected by pivots 129 to the pan 126. At its opposite ends the pan carries longitudinally extending conveyor rollers 131 and 132 around which an appropriate flight conveyor belt 133 is trained, so as to have an exposed, horizontal upper run. The conveyor belt 133 is driven by a flexible drive connection 134 to the shaft 116. The direction of advance of the upper run of the belt 133 transfers melons thereon toward one side of the frame. the transferred melons are deflected by an angular barrier 138 onto an upwardly ascending discharge conveyor 139.

Some of the vines resting on the belts 121 continue to carry melons that have not theretofore been detached. Some of these melons by their own weight detach themselves from the supported vines and fall between the belts 121. They also are received on the discharge conveyor 133. All of the melons detached from the vines by any means during the traverse of the vines through the machine are received on the conveyor 133 and are sent to the discharge conveyor 139.

Some vine parts may fall or droop in the general direction of the discharge conveyor 133 and to release them gently but to make sure that the melons thereon are not inadvertently discharged, a support rod 141 outstands from the rear of the pan 126 and carries along its length a plurality of bristle brushes 142. These are arranged so that their bristles 143 extend forwardly and upwardly (FIGURE 2) and form a wall overlying the trailing portion of the conveyor 133. The support portion 144 of each brush is pierced and journalled on the rod 141. Each of the brushes is urged downwardly against an inclined stop lip 146 on the pan 126 by an individual coil spring 147. With this structure, the bristles normally form a barrier along the trailing side of the conveyor 133. The bristles are sufficiently stiff and the springs 147 are sufficiently strong to retain any melons on the conveyor, but the bristles themselves will yield and under extreme stress the springs 147 will yield, so that any vines or vine parts which may happen to get caught in the bristles are permitted to pass without danger or damage to the vines.

As the carriage advances, the vines reach the trailing portion of the various belts 121 and then discharge thereover clear of the frame conveyor 133 and fall again to the ground. The vines, and still attached melons, return substantially to their former positions on the ground. The resiliency of the vines is such that they tend to rearrange themselves parallel to each other and with some extension laterally so that they are again very nearly if not exactly in the positions illustrated in FIGURE 7 before the harvesting operation. Since this is true, the harvester can be operated a number of times and under comparable conditions during the growing season in the field to harvest melons at different times as they ripen.

As especially illustrated in FIGURE 12, in effect each of the vines and its growing melons, having been previously trained to occupy a predetermined linear position with respect to its growing site, and being parallel to other similar vines arranged at growing sites aligned with the first, are in effect lifted by an encounter uniformly from one side and are held parallel to their original growing location on the ground but at a distance above the ground. This is true for all except a portion of the vine adjacent the trunk, which necessarily is lifted substantially vertically as shown in FIGURE 12 to accommodate the increasing height of the conveyor 57 as the machine advances. The melons themselves are supported by the conveyor 57 and many of them ready for picking are detached from their vines by the movement of the vine toward the free edge of the conveyor 57 and because of the pull resulting from the frictional resistance of the melon. Other melons are not detached until such time as they encounter the retaining belt 106 and are then detached to be carried with the previously picked melons over the rear end of the conveyor 57. Still other melons simply detach from the vines as the vines are resting on the belts 121 and fall by gravity to join the other melons on the discharge conveyor 133. Ultimately the remaining melons on the vine and the vine itself are restored to the ground by a vertical movement, the reverse of the lifting movement, and also extend lengthwise somewhat due to the resilience of the vines, so that eventually they occupy again the position from which they were originally lifted.

Although in many circumstances it is not necessary, it has been found in some cases highly advisable to provide an angular weed knife 151 extending transversely of the machine in a horizontal plane about at ground level. The knife is preferably attached to the frame 21 at one side only thereof, the other end 152 of the knife being completely free. Since the knife is cantilevered in position, it does not under any circumstances encounter the aligned trunks of the canteloupe vines at their aligned sites 7. By cutting the weeds in this fashion, they do not in any way interfere with the operation of the harvester.

In turning the machine at the end of a row and for transport in inactive condition, the jack 38 is actuated to raise the frame 46. An extension 153 at the rear of the frame then abuts a stop 154 and the forward end is then lifted to clear the ground. In rising, the arms of the crank axle 81 are engaged to lift the tubes 88. Lowering of the jack 38 restores the parts to operating position. For transport over long distances, the pivot pins 128 are withdrawn and the pan 126 is stowed temporarily elsewhere on the carriage.

What is claimed is:
1. A melon harvester for use with melons on vines growing in a field in a predetermined direction comprising a carriage movable in said field over said vines in a travelling direction normal to said predetermined direction; a conveyor frame generally rectangular in plan and having an inboard side, an outboard side, a horizontal leading edge and a horizontal trailing edge; means for mounting said conveyor frame on said carriage on said inboard side only to leave said outboard side free and with said conveyor frame inclined in said travelling direction to leave said leading edge close to said field and said trailing edge remote from said field; a lifting belt conveyor curved around said leading edge and said trailing edge of said conveyor frame and mounted thereon with the side edges of said lifting belt conveyor inclined in said travelling direction; a retaining belt conveyor frame having a top side, a bottom side, an upright leading end and an upright trailing end; means for mounting said retaining belt conveyor frame on said carriage on said inboard side only and from said top side only to leave said bottom side free and spaced above said outboard side and to leave a substantially inclined, unobstructed gap therebetween extending in said travelling direction for the full length of said conveyor frame; a retaining belt conveyor generally rectangular in side elevation curved around said leading end and said trailing end and mounted on said retaining belt conveyor frame with said top side and said bottom side extending in said travelling direction and substantially parallel to said lifting belt conveyor; means on said carriage for driving said lifting belt conveyor and said retaining belt conveyor with the adjacent runs of said belt conveyors travelling at substantially zero speed relative to said field; and means on said carriage at the rear of said lifting belt conveyor for supporting said vines in travelling from said trailing edge to said field.

2. A melon harvester as in claim 1 including means on said carriage at the rear of said lifting belt conveyor and beneath said vine supporting means for receiving melons from the trailing edge of said lifting belt conveyor.

3. A melon harvester as in claim 1 in which said inclined gap is smaller in an approximately vertical direction than melons being harvested.

4. A melon harvester as in claim 1 including means on said carriage forward of the leading edge of said lifting belt conveyor adapted to resist bulldozing of melons being encountered by said leading edge of said lifting belt conveyor.

5. A melon harvester as in claim 4 in which said resisting means includes a toroidal rubber tube flexibly mounted on a horizontal central rod.

References Cited
UNITED STATES PATENTS

| | | | |
|---|---|---|---|
| 2,516,957 | 8/1950 | Clark | 171—27 |
| 2,702,631 | 2/1955 | Hamaker | 56—15 X |
| 2,763,114 | 9/1956 | Carruthers | 56—1 |
| 2,829,484 | 4/1958 | Gilbert | 56—327 |
| 2,841,947 | 7/1958 | Grew | 56—327 |
| 2,903,839 | 9/1959 | Grew | 56—327 |
| 3,084,496 | 4/1963 | Leonard et al. | 56—327 |

ABRAHAM G. STONE, Primary Examiner.

P. A. RAZZANO, Assistant Examiner.